(12) United States Patent
Lingamneni

(10) Patent No.: US 10,489,380 B2
(45) Date of Patent: Nov. 26, 2019

(54) SYSTEMS AND METHODS FOR PROCESSING DATA SERVICE REQUESTS

(71) Applicant: AMERICAN EXPRESS TRAVEL RELATED SERVICES COMPANY, INC., New York, NY (US)

(72) Inventor: Krishna K. Lingamneni, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 188 days.

(21) Appl. No.: 15/392,278

(22) Filed: Dec. 28, 2016

(65) Prior Publication Data

US 2018/0181610 A1  Jun. 28, 2018

(51) Int. Cl.
  *G06F 16/00* (2019.01)
  *G06F 16/23* (2019.01)
  *G06F 21/10* (2013.01)
  *G06Q 20/20* (2012.01)

(52) U.S. Cl.
  CPC .......... *G06F 16/2365* (2019.01); *G06F 21/10* (2013.01); *G06Q 20/206* (2013.01)

(58) Field of Classification Search
  CPC ......... G06F 17/30371; G06F 17/30424; G06F 21/445; G06F 16/2365; G06F 21/10; H04L 63/061; H04N 21/4108; G06Q 20/206

USPC .......................................................... 707/690
See application file for complete search history.

(56) References Cited

U.S. PATENT DOCUMENTS

| | | | |
|---|---|---|---|
| 2005/0118987 A1* | 6/2005 | Isozaki | G06F 21/10 455/412.1 |
| 2005/0120091 A1* | 6/2005 | Casais | H04L 29/06 709/217 |
| 2010/0102123 A1* | 4/2010 | Skowronek | G06Q 20/20 235/380 |
| 2012/0155642 A1* | 6/2012 | Nakano | H04L 9/3273 380/255 |

* cited by examiner

*Primary Examiner* — Vincent F Boccio
(74) *Attorney, Agent, or Firm* — Thomas Horstemeyer, LLP

(57) ABSTRACT

Systems and methods for processing data service requests are disclosed. The system may receive a data service request comprising a unique process code and a data input. The system may parse the data service request to determine the unique process code. The system may retrieve a data operation sequence based on the unique process code. The data operation sequence may comprise an ordered list of executable operations. The system may generate an operation service request based on a first executable operation and the data input. The system may execute the operation service request.

20 Claims, 3 Drawing Sheets

SYSTEMS AND METHODS FOR PROCESSING DATA SERVICE REQUESTS

FIELD

The disclosure generally relates to accessing and interacting with data using data services, and more specifically, to systems and methods for processing data service requests.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. Users and business processes may interact with the data sets by invoking data services. Typically, business processes may consume multiple data services as part of each business process flow, and each data service may be executed independently of the other corresponding data services. In the event of a partial failure of any data service, the failed data service operations may be retried and/or re-executed after a predefined time interval (e.g., one day). This could lead to data integrity issues as some of the data services are successful, while others fail.

SUMMARY

In various embodiments, systems, methods, and articles of manufacture (collectively, the "system") for processing data service requests are disclosed. The system may receive a data service request comprising a unique process code and a data input. The system may parse the data service request to determine the unique process code. The system may retrieve a data operation sequence based on the unique process code. The data operation sequence may comprise an ordered list of executable operations. The system may generate an operation service request based on a first executable operation and the data input. The system may execute the operation service request.

In various embodiments, the system may also receive an operation service result. The operation service result may be based on the executing of the operation service request. The operation service result may comprise a received unique validation code. The system may retrieve a stored unique validation code related to the unique process code. The system may validate the execution of the operation service request by comparing the received unique validation code with the stored unique validation code.

In various embodiments, the operation service result may further comprise a data output. The system may generate a second operation service request based on a second executable operation and the data output. Each operation service request may comprise a plurality of data services related to the first executable operation.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may provide an improved level of accuracy for partial or complete name matching and/or address matching. The system may improve accuracy of partial or complete matching for user names, business names, addresses, and/or the like. In financial or legal contexts, the improved accuracy for name matching and/or address matching may also enable the system to reduce risk and/or loss associated with fraud, security breaches, regulatory rules and/or regulatory guidelines. Benefits of the present disclosure may apply to any suitable and/or desired name matching and/or address matching use (virtual or otherwise).

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

As used herein, "transmit" may include sending electronic data from one system component to another over a network connection. Additionally, as used herein, "data" may include encompassing information such as commands, queries, files, data for storage, and the like in digital or any other form.

Figure 1:
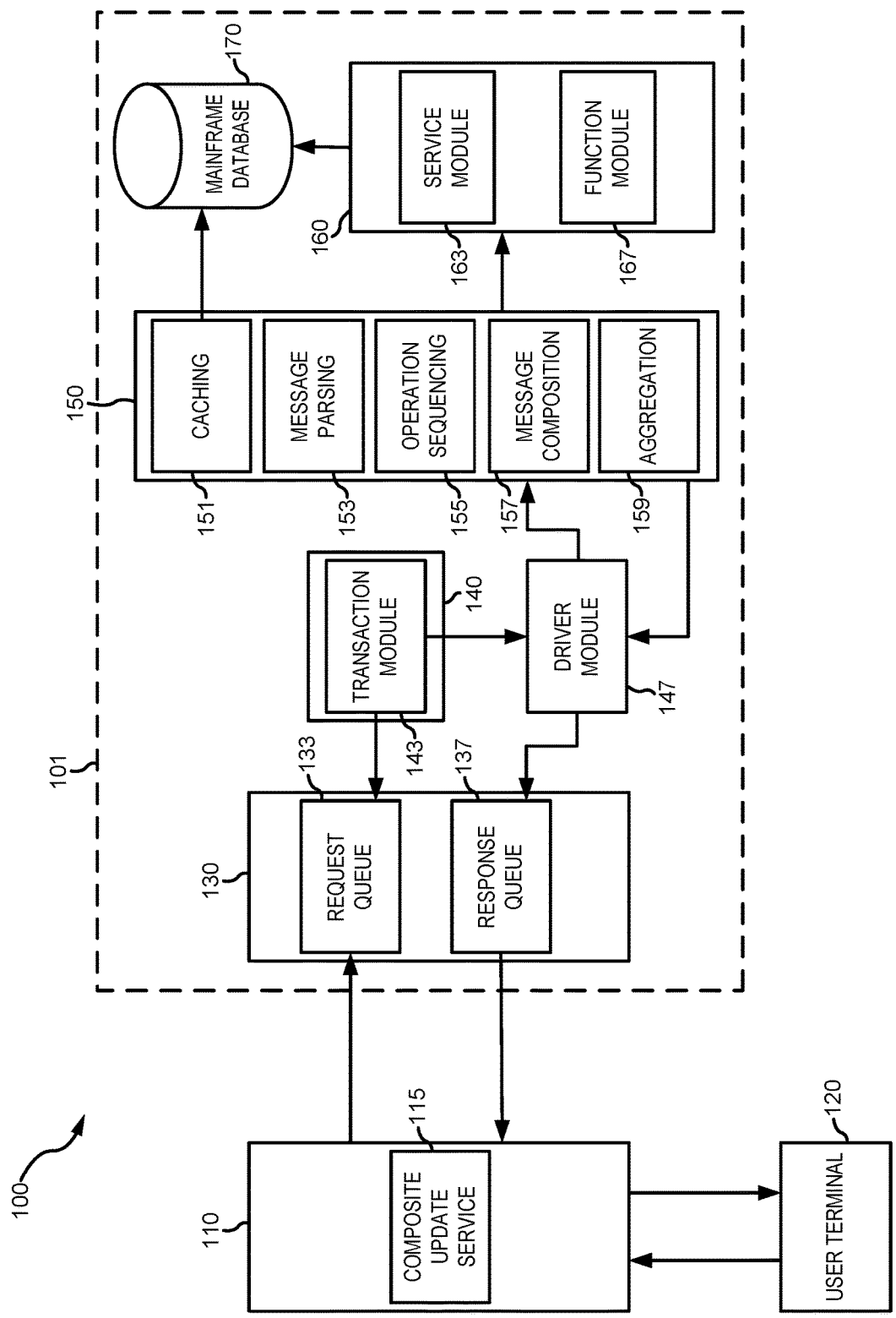
FIG. 1 is a block diagram illustrating various system components of a system for processing data service requests, in accordance with various embodiments.

In various embodiments, and with reference to FIG. 1, a system 100 for processing data service requests is disclosed. System 100 may comprise an integration layer service bus 110, a user terminal 120, and/or a mainframe environment 101. System 100 may comprise a framework to allow for the creation of data service requests, wherein each data service request corresponds to an ordered list of executable operations. The ordered executable operations may be executed together, instead of independently, allowing system 100 to maintain data integrity in the event of a single failure in an executable operation. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, integration layer service bus 110 may be configured as a central hub to access various systems, engines, and components of system 100. Integration layer service bus 110 may comprise a network, computer-based system, and/or software component configured to provide an access point to various systems, engines, and components. For example, integration layer service bus 110 may comprise a logical interconnection permitting communication between user terminal 120 and mainframe environment 101. Integration layer service bus 110 may be in electronic and/or operable communication with user terminal 120 and/or mainframe environment 101.

In various embodiments, user terminal 120 may comprise hardware and/or software allowing a user to interact with various components and modules in system 100. For example, user terminal 120 may comprise any suitable device allowing a user to communicate with a network, such as a personal computer, personal digital assistant, cellular phone, kiosk, and/or the like. User terminal 120 may be in electronic and/or operative communication with integration layer service bus 110. User terminal 120 may allow the user to communicate with mainframe environment 101, via integration layer service bus 110, to input a user data service request. In that respect, the user may select, via user terminal 120, a business data service. The business data service may comprise any suitable and/or desired service comprising an interaction with data from mainframe environment 101. For example, the business data service may comprise enrolling a transaction card member into an offer, registering a user into a new transaction account, updating user account information, and/or any other suitable data related service. Each business data service may comprise a corresponding unique process code. The unique process code may comprise any suitable identifier, such as numerical, alpha-numerical, and/or the like (e.g., "12345", "ABCDE", "A1234", etc.). The unique process code may be assigned to each corresponding business data service. The user data service request may also comprise a data input. The data input may be related to the selected business process. For example, where the selected business process comprises updating user account information, the data input may comprise the user account information to update (e.g., an updated user address, phone number, etc.). In that regard, user terminal 120 may prompt the user for a data input in response to the user selecting a business data service. User terminal 120 may transmit the user data service request to integration layer service bus 110.

In various embodiments, integration layer service bus 110 may comprise a composite update service 115. Composite update service 115 may be configured to receive the user data service request from user terminal 120. Composite update service 115 may parse the user data service request to determine the unique process code. In various embodiments, composite update service 115 may include an input schema control table. The input schema control table may comprise a variety of unique process code input schemas. In that respect, each unique process code input schema may correspond to a unique process code. Each unique process code input schema may comprise formatting instructions for composite update service 115 to execute, in response to receiving a user data service request. For example, in response to determining the unique process code from the user data service request, composite update service 115 may retrieve the corresponding unique process code input schema. Composite update service 115 may reformat the user data service request by mapping the data input to the unique process code input schema (e.g., by placing data from the data input into corresponding preset data fields from the unique process code input schema). Composite update service 115 may generate a data service request comprising the unique process code and the reformatted data input. In various embodiments, integration layer service bus 110 may transmit the data service request to mainframe environment 101 (e.g., request queue 133 of message queue 130).

In various embodiments, mainframe environment 101 may comprise various engines, modules, and/or databases. Mainframe environment 101 may comprise a message queue 130, a customer information control system (CICS) 140, a driver module 147, a composite services framework 150, a data services module 160, and/or a mainframe database 170. Mainframe database 170 may comprise any suitable database structure capable of storing data. Mainframe database 170 may be configured to store any suitable and/or desired data. For example, mainframe database 170 may comprise sensitive data, and mainframe environment 101 may comprise a secure environment from which to access the sensitive data. In various embodiments, mainframe database 170 may comprise data relating to transaction account holders, such as, for example, transaction account holder identifying information (e.g., account ID, name, address, contact information, etc.), and/or the like.

In various embodiments, message queue 130 may comprise various engines, modules, and/or databases configured to allow message queue 130 to receive data service requests and data service responses. Message queue 130 may be in electronic and/or operative communication with integration layer service bus 110, CICS 140, and/or driver module 147. Message queue 130 may comprise a request queue 133 and/or a response queue 137. Request queue 133 may be configured to receive the data service request from integration layer service bus 110. Request queue may comprise a database, software, and/or the like configured to receive and store data service requests. Response queue 137 may be configured to receive a data service response from driver module 147, as discussed further herein. Response queue 137 may comprise a database, software, and/or the like configured to receive and store data service responses.

In various embodiments, CICS 140 may be configured to provide front end management and connectivity for various applications in mainframe environment 101. CICS 140 may comprise middleware configured to support high-volume transaction processing. CICS may be in electronic and/or operative communication with message queue 130 and/or driver module 147. CICS 140 may comprise a transaction module 143. Transaction module 143 may be configured to retrieve the data service requests from message queue 130. Transaction module 143 may retrieve the data service requests in real time, in batches, and/or at any other suitable timing. For example, transaction module 143 may be configured to retrieve the data service requests hourly, daily, weekly, and/or the like. Transaction module 143 may also be configured to transmit the data service requests to driver module 147.

In various embodiments, driver module 147 may comprise various engines, modules, and systems. Driver module 147 may be in electronic and/or operable communication with message queue 130 and/or CICS 140. Driver module 147 may be configured as an interface for composite services framework 150, wherein driver module 147 may transmit the data service requests and receive and/or transmit the data service responses (as discussed further herein). For example, driver module 147 may receive the data service requests from CICS 140 and may transmit the data service requests to composite services framework 150. Driver module 147 may receive the data service responses from composite services framework 150 and may transmit the data service responses to response queue 137, via message queue 130.

In various embodiments, composite services framework 150 may comprise various engines, modules, and/or databases. For example, composite services framework 150 may comprise a caching module 151, a message parsing module 153, an operation sequencing module 155, a message composition module 157, and/or an aggregation module 159. Composite services framework 150 may be in logical and/or operative communication with driver module 147, data services module 160, and/or mainframe database 170. Composite services framework 150 may be configured to execute a variety of operations, as discussed further herein, in response to receiving the data service request from driver module 147. Composite services framework 150 may cache the data service requests in caching module 151. Caching module 151 may comprise working storage allowing composite services framework 150 to quickly store and retrieve data.

In various embodiments, composite services framework 150 may parse the data services request, via message parsing module 153. Message parsing module 153 may parse the data service request to determine the unique processing code. In that respect, message parsing module 153 may analyze the data service request to determine the unique processing code associated with the data service request.

In various embodiments, operation sequencing module 155 may be configured to determine the sequence of operations for the parsed unique processing code. Operation sequencing module 155 may comprise various control tables. Each control table may allow operation sequencing module 155 to determine the sequence of operations corresponding to each unique process code. For example, operation sequencing module 155 may comprise an operation sequence control table. The operation sequence control table may comprise data relating to a sequence of executable operations corresponding to each unique process code. Each unique process code entry in the operation sequence control table may comprise a data operation sequence. The data operation sequence may comprise an ordered list of executable operations, each executable operation defined by an operation code ID. The operation code ID may comprise a unique identifier corresponding to an executable operation. As an example, in the operation sequence control table entry for a unique process code "12345", the data operation sequence may comprising comprise a first operation code ID of "OC1" (or a first executable operation), a second operation code ID of "OC40" (or a second executable operation), a third operation code ID of "OC15" (or a third executable operation), and a fourth operation code ID of "OC 32" (or a fourth executable operation). Operation sequencing module 155 may query the operation sequence control table to determine the data operation sequence for the parsed unique process code.

In various embodiments, message composition module 157 may be configured to generate an operation service request. Message composition module 157 may comprise various software, hardware, and/or database to aid in generating the operation service requests. For example, message composition module 157 may comprise various control tables. Each control table may allow message composition module 157 to determine data associated with each operation code ID specified in the data operation sequence. In that respect, message composition module 157 may comprise an operation code control table. The operation code control table may allow message composition module 157 to map data to the requirements of each operation code ID, in a format readable and executable by data services module 160. For example, for each operation code ID, the operation code control table may comprise the data services to execute for that corresponding operation and the data input required for each data service. The data services may comprise service commands to execute on mainframe database 170, such as, for example, inquiries, updates, deletes, business rules, validations, and/or the like. For example, an update data service may comprise instructions to update a field in a data entry, an inquiry data service may comprise instructions to determine a value of a field in a data entry, a delete data service may comprise instructions to delete and/or remove a field in a data entry, and/or the like. Each data service may specify an operation data needed for each data service. For example, the data service may specify an operation data consisting of the data input received from the data service request. In that regard, and in various embodiments, the data service may specify the data to retrieve from the data input, based on the previously completed parsing of the user data service request and reformatting of the user data input based on the unique process code schema. As a further example, and in various embodiments, the operation data may comprise a data output from a previously executed data service, as discussed further herein.

In various embodiments, the operation service request may be generated to comprise the unique process code, the operation code ID, the data services to execute, the operation data corresponding to the each data service, and/or any other suitable data. Message composition module 157 may generate the operation service request and transmit the operation service request to data services module 160. In that respect, message composition module 157 may iteratively generate operation service requests for each operation code ID corresponding to the unique process code.

In various embodiments, data services module 160 may comprise a variety of modules, engines, services, databases, and/or the like configured to execute data services in mainframe database 170. For example, data services module 160 may include a services module 163 and/or a function module 167. Services module 163 may be configured to receive the operation service request from composite services framework 150. Services module 163 may parse the operation service request to determine the operation code ID, the data services, and the operation data corresponding to each data service. Services module 163 may execute each data service in the operation service request on mainframe database 170.

In various embodiments, function module 167 may be configured to monitor the execution of the operation service request. Function module 167 may monitor the execution and generate an operation service result based on the execution. The operation service result may comprise the unique process code, the operation code ID, the data services executed, an execution result, and/or any other suitable data. For example, the operation service result may also comprise a data output. The data output may comprise data and/or values retrieved from the execution of the operation service request. In various embodiments, the operation service result may also comprise a validation value. For example, in response to a successful execution on mainframe database 170 (e.g., services module 163 received no errors during execution of the operation service request) function module 167 may generate a validation value indicating a successful execution (e.g., "1", "S", etc.). In response to a failed execution on mainframe database 170 (e.g., services module 163 received errors during execution of the operation service request and/or was unable to execute a data service) function module 167 may generate a validation value indicating a failed execution (e.g., "0", "F", etc.). The validation value may also comprise a received unique validation code, such as, for example, "VAL1", "VAL2", and/or the like. Each received unique validation code may correspond to the unique process code, and may indicate a successful execution. Function module 167 may transmit the operation service result to composite services framework 150.

In various embodiments, composite services framework 150 may be configured to validate the execution of each operation service request. Composite services framework 150, via message composition module 157, may validate the execution of each operation service request after each operation service request is executed, after all of the operation service requests for a given data service request are executed, based on a specified validation event from a data service in an operation service request, and/or at any other suitable and/or desired time. In various embodiments, message composition module 157 may comprise various control tables to aid in validation of each executed operation service request. For example, message composition module 157 may comprise a validation control table. The validation control table may comprise data related to each unique process code. For example, the validation control table may comprise a stored unique validation code for each unique process code. In that respect, message composition module 157 may compare the received unique validation code against the stored unique validation code to validate the executed operation service request. For example, in response to the codes matching, the executed operation service request may be validated. In response to the codes not matching, the executed operation service request may fail validation. In response to a failed validation, message composition module 157 may alert composite service framework to stop executing operation service results.

In various embodiments, aggregation module 159 may be configured to generate a data service response. The data service response may comprise data regarding the operation service results for all of the executed operation service requests. In that respect, aggregation module 159 may generate the data service response after execution of all the data operations from the data operation sequence related to the unique process code. Aggregation module 159 may generate the data service response to comprise at least the unique process code, and/or an aggregation of the operation service results. The data service response may be transmitted to response queue 137, via driver module 147. Response queue 137 may transmit the data service response to user terminal 120, via integration layer service bus 110. Integration layer service bus 110 may transmit the data service response to user terminal 120 using any suitable technique, such as, for example, via email, text message, and/or the like.

In various embodiments, a user may review the data service response on user terminal 120 to review data related to the execution of the previously selected business data service. For example, the user may desire to determine whether the selected business data service executed without any failures. In various embodiments, user terminal 120 may also be configured to automatically review the data service response to determine success and/or failure of the executed services. User terminal 120 may parse the data service response to determine whether any of the executed data services failed. In response to determining a failure, user terminal 120 may request mainframe environment 101, via integration layer service bus 110, to roll back the data changes made in mainframe database 170.

Figure 2:
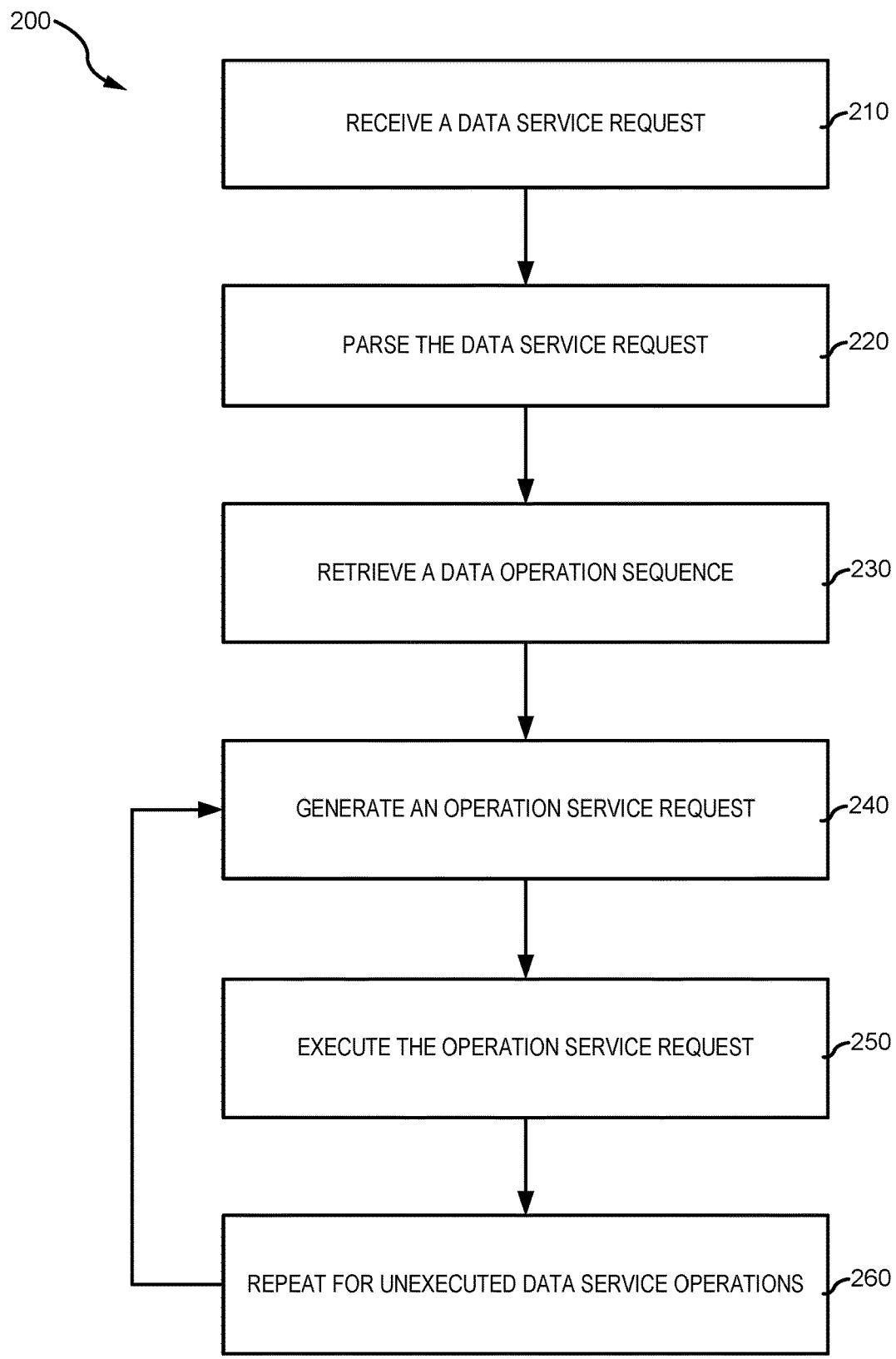
FIG. 2 illustrates a process flow for a method for processing data service requests, in accordance with various embodiments.

In various embodiments, and with reference to FIGS. 2 and 1, a method 200 for processing data service requests is disclosed. Method 200 may comprise receiving a data service request (Step 210). Composite services framework 150 may retrieve the data service request. In that respect, a user data service request may be transmitted from user terminal 120 to integration layer service bus 110. The user data service request may correspond to a unique process code. The user data service request may also comprise a data input related to the user data service request. Integration layer service bus 110, via composite update service 115 may parse the user data service request to determine the unique process code. Integration layer service bus 110 may generate the data service request by reformatting the user data service request based on a unique process code input schema related to the parsed unique process code. Integration layer service bus 110 may transmit the data service request to request queue 133. CICS 140, via transaction module 143 may retrieve the data service request from request queue 133, and may transmit the data service request to driver module 147. Composite services framework 150 may receive the data service request from driver module 147.

In various embodiments, method 200 may comprise parsing the data service request (Step 220) to determine the unique process code. Composite services framework 150, via message parsing module 153, may parse the data service request to determine the unique process code. Method 200 may also comprise retrieving a data operation sequence (Step 230). Composite services framework 150, via operation sequencing module 155, may retrieve the data operation sequence. Composite services framework 150 may retrieve the data operation sequence from an operation sequence control table, based on the unique process code. The data operation sequence may comprise an ordered list of executable operations, based on an operation code ID.

In various embodiments, method 200 may comprise generating an operation service request (Step 240). Composite services framework 150, via message composition module 157, may generate the operation service request. Composite services framework 150 may query an operation code control table to determine the data services to execute for each operation code ID. The operation code control table may allow message composition module 157 to map data to the requirements of each operation code ID, in a format readable and executable by data services module 160. For example, for each operation code ID, the operation code control table may comprise the data services to execute for that corresponding operation code ID and the data input required for each corresponding data service. The data services may comprise service commands to execute on mainframe database 170, such as, for example, inquiries, updates, deletes, business rules, validations, and/or the like. Each data service may specify an operation data needed for each data service. For example, the data service may specify an operation data consisting of the data input received from the data service request. In that regard, and in various embodiments, the data service may specify the data to retrieve from the data input, based on the previously completed parsing of the user data service request and reformatting of the user data input based on the unique process code schema. As a further example, and in various embodiments, the operation data may comprise a data output from a previously executed data service, as discussed further herein. Composite services framework 150 may generate the operation service request to comprise the unique process code, the operation code ID, the data services to execute, the operation data corresponding to the each data service, and/or any other suitable data.

In various embodiments, method 200 may comprise executing the operation service request (Step 250). Composite services framework 150, via message composition module 157, may transmit the operation service request to data services module 160. Data services module 160, via services module 163, may parse the operation service request to determine the operation code ID, the data services, and the operation data corresponding to each data service. Data services module 160 may execute each data service in the operation service request on mainframe database 170. Method 200 may also comprise repeating for unexecuted data service operations (Step 260). In that regard, method 200 may repeat Step 240 and Step 250 for each operation code ID from the data operation sequence.

Figure 3:
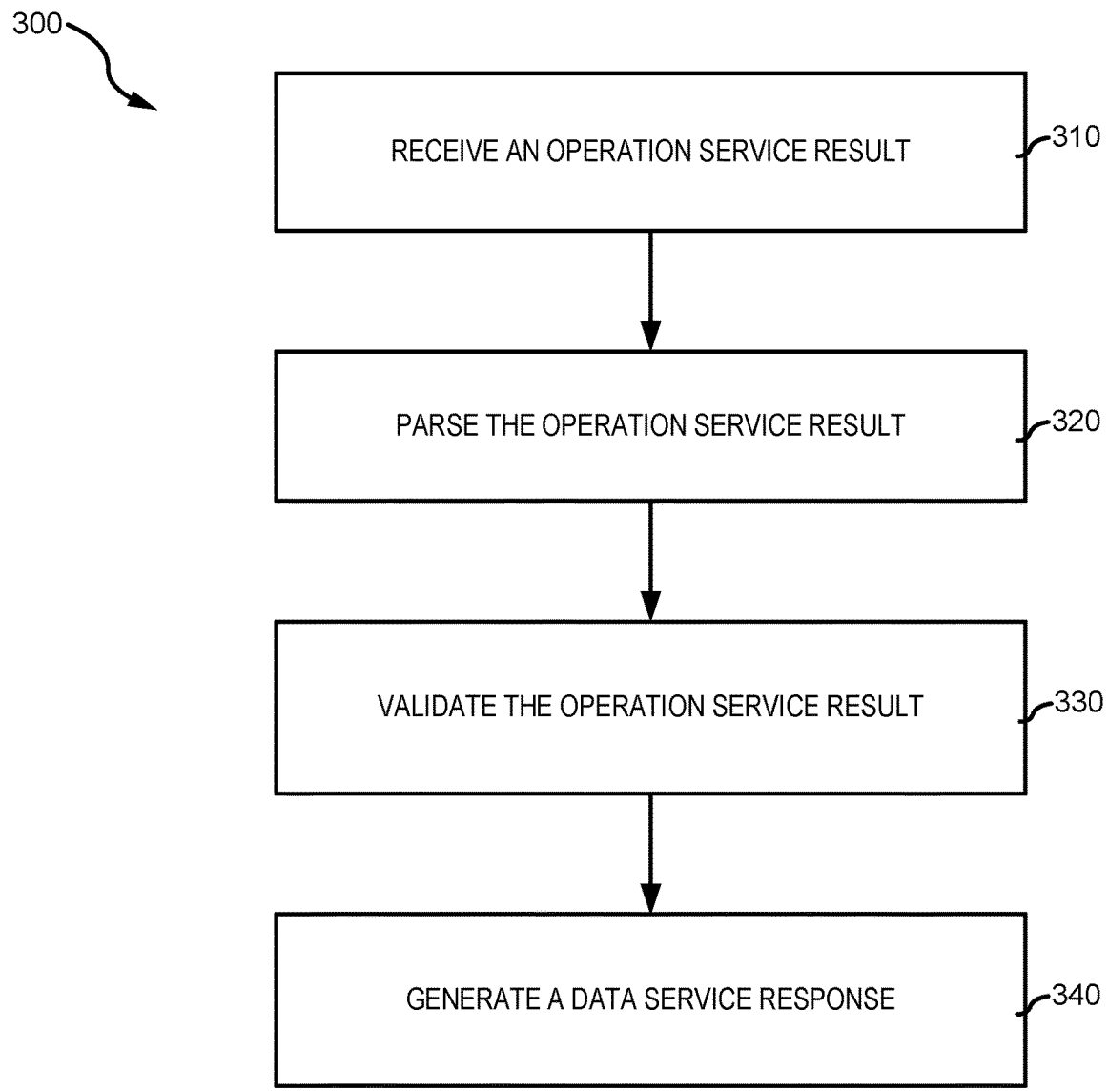
FIG. 3 illustrates a process flow for a method for validating data service requests, in accordance with various embodiments.

In various embodiments, and with reference to FIGS. 3 and 1, a method 300 for validating the execution of operation service requests is disclosed. Method 300 may comprise receiving an operation service result (Step 310). Data services module 160, via function module 167, may generate the operation service result based on the execution of the operation service request (e.g., Step 250 of method 200). The operation service result may comprise the unique process code, the operation code ID, the data services executed, an execution result, and/or any other suitable data. For example, the operation service result may also comprise a data output. The data output may comprise data and/or values retrieved from the execution of the operation service request. In various embodiments, the operation service result may also comprise a validation value. The validation value may also comprise a received unique validation code, such as, for example, "VAL1", "VAL2", and/or the like. Each received unique validate code may correspond to the unique process code, and may indicate a successful execution. Data services module 160 may transmit the operation service result to composite services framework 150.

In various embodiments, method 300 may comprise parsing the operation service request (Step 320). Composite services framework 150, via message composition module 157, may parse the operation service request to determine the unique process code and the received unique validation code. Composite services framework 150 may query a validation control table, comprising data related to each unique process code. For example, the validation control table may comprise a stored unique validation code for each unique process code. In various embodiments, method 300 may comprise validating the operation service result (Step 330). Composite services framework 150, via message composition module 157, may validate the execution of each operation service request after each operation service request is executed (e.g., after Step 250 of method 200), after all of the operation service requests for a given data service request are executed (e.g., after Step 260 of method 200), based on a specified validation event from a data service in an operation service request, and/or at any other suitable and/or desired time. Composite services framework 150 may compare the received unique validation code against the stored unique validation code to validate the executed operation service request. For example, in response to the codes matching, the executed operation service request may be validated. In response to the codes not matching, the executed operation service request may fail validation. In response to a failed validation, message composition module 157 may alert composite service framework to stop executing operation service results.

In various embodiments, method 300 may comprise generating a data service response (Step 340). Composite services framework 150, via aggregation module 159, may be configured to generate the data service response. The data service response may comprise data regarding the operation service results for all of the executed operation service requests. In that respect, composite services framework 150 may generate the data service response after execution of all the data operations from the data operation sequence related to the unique process code. Aggregation module 159 may generate the data service response to comprise at least the unique process code, and/or an aggregation of the operation service results. The data service response may be transmitted to response queue 137, via driver module 147. Response queue 137 may transmit the data service response to user terminal 120, via integration layer service bus 110.

The disclosure and claims do not describe only a particular outcome of executing data service requests, but the disclosure and claims include specific rules for implementing the outcome of executing data service requests and that render information into a specific format that is then used and applied to create the desired results of executing data service requests, as set forth in *McRO, Inc. v. Bandai Namco Games America Inc.* (Fed. Cir. case number 15-1080, Sep. 13, 2016). In other words, the outcome of executing data service requests can be performed by many different types of rules and combinations of rules, and this disclosure includes various embodiments with specific rules. While the absence of complete preemption may not guarantee that a claim is eligible, the disclosure does not sufficiently preempt the field of data service requests at all. The disclosure acts to narrow, confine, and otherwise tie down the disclosure so as not to cover the general abstract idea of just executing data service requests. Significantly, other systems and methods exist for executing data service requests, so it would be inappropriate to assert that the claimed invention preempts the field or monopolizes the basic tools of executing data service requests. In other words, the disclosure will not prevent others from executing data service requests, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system may include alerting a user when their computer (e.g., user terminal 120) is offline. The system may include generating customized information (e.g., the name matching history report) and alerting a remote user that the information can be accessed from their computer (e.g., user terminal 120). The alerts are generated by filtering received information, building information alerts and formatting the alerts into data blocks based upon user preference information. The data blocks are transmitted to the user's wireless device (e.g., user terminal 120) which, when connected to the computer, causes the computer to auto-launch an application to display the information alert and provide access to more detailed information about the information alert. More particularly, the system may comprise providing a viewer application to a user for installation on the remote user computer; receiving information at a transmission server (e.g., message queue 130) sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote user computer and to enable connection via the URL to the data source over the Internet when the wireless device is locally connected to the remote user computer and the remote user computer comes online.

In various embodiments, the system may include a graphical user interface for dynamically relocating/rescaling obscured textual information (such as, for example, data from the data service response) of an underlying window to become automatically viewable to the user. By permitting textual information to be dynamically relocated based on an overlap condition, the computer's (e.g., user terminal 120) ability to display information is improved. More particularly, the system may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., user terminal 120) from being compromised, for example by being infected with a computer virus, when a user requests or interacts with virtual tokens. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over users during name, using a system for co-marketing the "look and feel" of the host web page (e.g., a web page hosted by system 100) with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer, via user terminal 120, for example, so that she effectively remains on the host web page to search for a name without being redirected to the third party merchant affiliate. Because such composite pages are visually perceived by the customer as associated with the host web page, they give the customer the impression that she is viewing pages served by the host. Further, the customer is able to search for a name without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to an "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944, 849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set.

As discussed above, the binary information may be stored on the financial transaction instrument or external to but affiliated with the financial transaction instrument. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   receiving, by a processor, a data service request comprising a process code and a data input related to the data service request,
   wherein the process code is associated with a business process;
   reformatting, by the processor, the data service request based on an input schema related to the process code;
   retrieving, by the processor, a data operation sequence based on the process code, wherein the data operation sequence is associated with the business process, and wherein the data operation sequence comprises an ordered list of executable operations based on an operation code identifier to complete the business process;
   querying, by the processor, an operation code control table to determine a data service to execute for the operation code identifier,
   wherein the data service comprises service commands for execution,
   wherein the data service specifies operation data consisting of the data input received from the data service request,
   wherein the data service specifies data to retrieve from the data input, and
   wherein the operation data comprises a data output from the data service that was previously executed;
   mapping, by the processor, the data input to requirements of the operation code identifier in a format readable and executable by a data services module;
   generating, by the processor, an operation service request based on a first executable operation and the data input,
   wherein the operation service request comprises the process code, the operation code identifier, the data service to execute, and the operation data corresponding to the data service;
   determining, by the processor, the operation code identifier, the data service, and the operation data corresponding to the data service; and
   executing, by the processor, the data service in the operation service request.

2. The method of claim 1, further comprising receiving, by the processor, an operation service result, wherein the operation service result is based on the executing of the data service in the operation service request, wherein the operation service result comprises a received validation code.

3. The method of claim 2, further comprising retrieving, by the processor, a stored validation code related to the process code of the data service request.

4. The method of claim 3, further comprising validating, by the processor, the executing the data service in the operation service request by comparing the received validation code with the stored validation code.

5. The method of claim 2, wherein the operation service result further comprises the data output.

6. The method of claim 1, further comprising generating, by the processor, a second operation service request based on a second executable operation and the data output.

7. The method of claim 1, wherein the operation service request comprises a plurality of data services related to the first executable operation.

8. The method of claim 1, wherein the service commands include at least one of inquiries, updates, deletes, business rules or validations.

9. The method of claim 1, wherein the executing is repeated for additional of the operation code identifier from the data operation sequence.

10. A system comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor, a data service request comprising a process code and a data input related to the data service request,
wherein the process code is associated with a business process;
reformatting, by the processor, the data service request based on an input schema related to the process code;
retrieving, by the processor, a data operation sequence based on the process code, wherein the data operation sequence is associated with the business process, and wherein the data operation sequence comprises an ordered list of executable operations based on an operation code identifier to complete the business process;
querying, by the processor, an operation code control table to determine a data service to execute for the operation code identifier,
wherein the data service comprises service commands for execution,
wherein the data service specifies operation data consisting of the data input received from the data service request,
wherein the data service specifies data to retrieve from the data input, and
wherein the operation data comprises a data output from the data service that was previously executed;
mapping, by the processor, the data input to requirements of the operation code identifier in a format readable and executable by a data services module;
generating, by the processor, an operation service request based on a first executable operation and the data input,
wherein the operation service request comprises the process code, the operation code identifier, the data service to execute, and the operation data corresponding to the data service; determining, by the processor, the operation code identifier, the data service, and the operation data corresponding to the data service; and
executing, by the processor, the data service in the operation service request.

11. The system of claim 10, further comprising validating, by the processor, the execution of the data service in the operation service request by comparing a received validation code with a stored validation code, wherein an operation service result comprises the received validation code.

12. The system of claim 10, further comprising receiving, by the processor, an operation service result, wherein the operation service result is based on the executing of the data service in the operation service request, wherein the operation service result comprises a received unique validation code, wherein the operation service result further comprises the data output.

13. The system of claim 10, further comprising generating, by the processor, a second operation service request based on a second executable operation and the data output.

14. The system of claim 10, wherein the operation service request comprises a plurality of data services related to the first executable operation.

15. An article of manufacture including a non-transitory, tangible computer readable storage medium having instructions stored thereon that, in response to execution by a computer based system, cause the computer based system to perform operations comprising:
receiving, by the computer based system, a data service request comprising a process code and a data input related to the data service request,
wherein the process code is associated with a business process;
reformatting, by the computer based system, the data service request based on an input schema relate to the process code;
retrieving, by the computer based system, a data operation sequence based on the process code, wherein the data operation sequence is associated with the business process, and wherein the data operation sequence comprises an ordered list of executable operations based on an operation code identifier to complete the business process;
querying, by the computer based system, an operation code control table to determine a data service to execute for the operation code identifier,
wherein the data service comprises service commands for execution,
wherein the data service specifies operation data consisting of the data input received from the data service request,
wherein the data service specifies data to retrieve from the data input, and
wherein the operation data comprises a data output from the data service that was previously executed;
mapping, by the computer based system, the data input to requirements of the operation code identifier in a format readable and executable by a data services module;
generating, by the computer based system, an operation service request based on a first executable operation and the data input,
wherein the operation service request comprises the process code, the operation code identifier, the data service to execute and the operation data corresponding to the data service;
determining, by the computer based system, the operation code identifier, the data service, and the operation data corresponding to the data service; and
executing, by the computer based system, the data service in the operation service request.

16. The article of manufacture of claim 15, further comprising receiving an operation service result, wherein the operation service result is based on the executing of the data service in the operation service request, wherein the operation service result comprises a received validation code.

17. The article of manufacture of claim 16, further comprising retrieving a stored validation code related to the process code of the data service request, and validating the executing of the data service in the operation service request by comparing the received validation code with the stored validation code.

18. The article of manufacture of claim 16, wherein the operation service result further comprises the data output.

19. The article of manufacture of claim 15, further comprising generating a second operation service request based on a second executable operation and the data output.

20. The article of manufacture of claim 15, wherein the operation service request comprises a plurality of data services related to the first executable operation.

* * * * *